April 12, 1949. J. F. GULYBAN 2,467,207
UTILITY ELECTRIC LAMP
Filed March 19, 1945
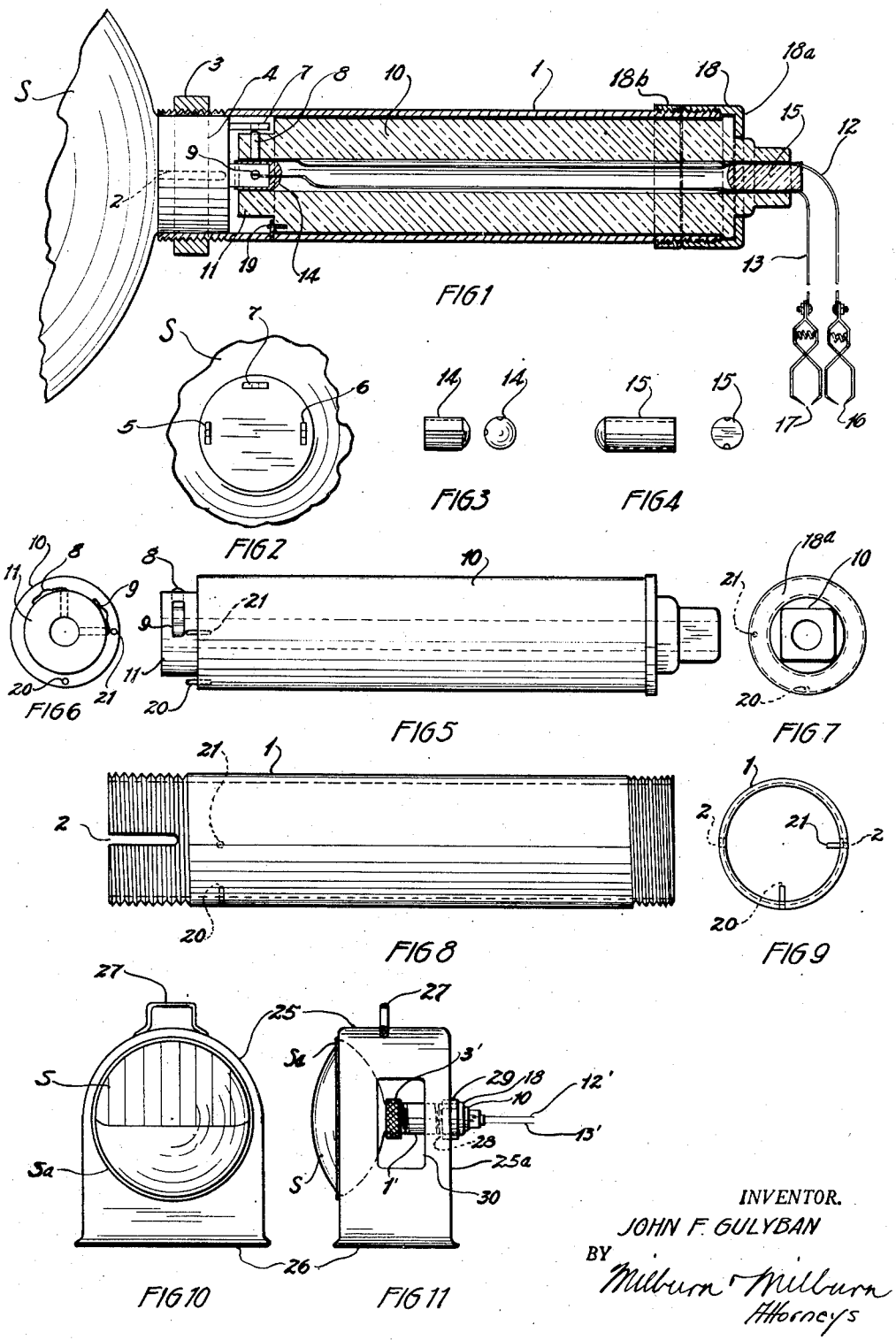
INVENTOR.
JOHN F. GULYBAN
BY Milburn & Milburn
Attorneys Patented Apr. 12, 1949

2,467,207

UNITED STATES PATENT OFFICE 2,467,207

UTILITY ELECTRIC LAMP

John F. Gulyban, Cleveland, Ohio

Application March 19, 1945, Serial No. 583,419

1 Claim. (Cl. 240—8.18)

This invention is for a general utility electric lamp and relates especially to an improved form of holder which is adapted to receive in one end thereof a familiar "seal-beam" head lamp of an automobile and which is provided with electric wire connections at its other end for removable connection to a suitable source of current.

One primary use for this lamp is as a trouble lamp, about an automobile for instance, but the present device is not to be understood as being limited to this particular purpose as it is adapted for more general utility.

It is of course understood that there have already been devised various types of trouble lamps for use about an automobile, as well as various other types of portable electric lamps that are provided with electric cords for attachment to a suitable source of electric current.

But the purpose of the present invention is to make it possible to use as part of such a utility lamp a "seal-beam" head lamp of the modern automobile; and, with this purpose in mind, I have devised a particular form and construction of holder for the lamp and for the electric connections therefor through the holder to which it may be applied according to this invention.

Thus it is the object of this invention to provide a suitable holder for one of the "seal-beam" head lamps which may be temporarily removed from the automobile or for a "seal-beam" lamp which is partially burned out and which therefore is no longer useful as a head lamp upon an automobile.

Another object is to provide such a holder with suitable switch means whereby either of the filaments of a "seal-beam" lamp may be included in the electric circuit for lighting purposes while serving as part of this utility lamp device.

Another object is to provide such a simple form of structure that it can be manufactured at a low cost and sold at popular price to the owners of automobiles as well as for other purposes of general utility.

Another object is to provide such a device with means for readily attaching and removing a "seal-beam" lamp to and from the holder therefor so that the head light of an automobile may be temporarily employed as part of such a utility lamp and then removed from such holder and replaced upon the automobile.

Another object is to provide such a utility lamp with means whereby it may be connected to an automobile so as to utilize the automobile battery as the source of current for the utility lamp instead of having to depend upon another source of electric current therefor.

Other objects will appear from the following description and claims when considered together with the accompanying drawing.

Fig. 1 is a longitudinal section of my present device;

Fig. 2 is an end view of the socket of a "seal-beam" lamp;

Fig. 3 includes side and end views of the insulation plug at the front end of the core within the lamp body;

Fig. 4 includes side and end views of the insulation plug at the rear end of the core within the lamp body;

Fig. 5 is a side elevation of the insulation core;

Fig. 6 is a front end elevation of the insulation core;

Fig. 7 is a rear end elevation of the insulation core;

Fig. 8 is a side elevation of the outer shell of the lamp body;

Fig. 9 is a front elevation of the outer shell;

Fig. 10 is a front elevation of modified embodiment of my invention; and

Fig. 11 is a side elevation of the modified embodiment shown in Fig. 10.

It is to be understood that the present disclosure is merely for the purpose of illustration and that there might be devised various modifications without departing from the spirit of my invention as herein set forth and claimed.

I shall refer first to the form of device shown in Fig. 1. The outside of the holder is in the form of a shell or casing 1 of metal or other suitable material which may be of tubular shape and which is provided with screw threads at each end thereof, as indicated in the drawing. The forward end of this shell 1 is split, as indicated at 2, so as to co-operate with the screw-threaded ring 3 for removably holding the shank 4 of the "seal-beam" lamp S in position within the forward end of the holder.

As will be understood by those who are familiar with the "seal-beam" lamp, it is provided with two filaments which are arranged so as to throw their lights at different angles, one of them being employed to illuminate the road-way for a greater distance while the other is intended for directing the beam of light in a more downward direction and for a much shorter distance along the road-way so as not to seriously affect the vision of the on-coming motorist. These two filaments are connected to their respective terminals 5 and 6 at the rear end of the shank 4 of the lamp and this lamp is provided also with a return contact 7. These three terminals 5, 6 and 7 are located inwardly on the shank 4 to a sufficient extent to be free of contact with the inner surface of the shell or casing 1 but are adapted to have frictional engagement with the electric resilient contacts 8 and 9, respectively upon the forward end of the hollow core 10 of fibre or other suitable electric insulating material which fits inside of the shell or casing 1. The forward end of the core 10 is formed with a reduced portion 11 of proper dimensions to accommodate the terminals 5, 6 and 7 and to ensure effective electrical engagement of the same with the contacts 8 and 9. The two contacts 8 and 9 extend through the reduced end portion 11 of the fibre core 10 and are connected at their inner ends to the forward ends of the electric wires 12 and 13; while their outer end portions extend partially about the reduced end 11 so as to more effectively hold the same in assembly and are provided with the restricted resilient projections for ensuring effective electrical engagement with the terminals 5, 6 and 7 in the different positions of adjustment, as will be explained. The end plug 14 of electric insulating material is inserted into the end of the hollow core 10 and serves to hold the wires 12 and 13 in proper position and will also prevent any short circuit between the bared ends of the wires at the points where they are connected to the contacts 8 and 9. At the rear end of the core 10 I have provided another end plug 15 which is inserted between the electric wires 12 and 13; and this rear plug may be provided with side grooves to accommodate the electric wires. The plug 15 will also be of suitable electric insulation material. The wires 12 and 13 may be of any desired length and are provided at their rear ends with suitable clamps 16 and 17 for ready and removable attachment to any suitable body through which the electric current is to be derived. For instance, one of these clamps may be attached to a live line that is connected to the battery of an automobile while the other clamp may be grounded upon the body of the automobile, thereby connecting the automobile battery in circuit with the utility lamp.

The core 10 is held in position within the outer casing or shell 1 by means of the member 18 which has screw-threaded engagement with the rear end of the casing 1 and is provided with a flange 18a. A lock nut 18b limits the extent of movement of member 18 so as to leave suitable clearance for the shoulder, at the rear end of the core 10, between the flange 18a and the rear end of the casing 1, this arrangement being made so as to thereby permit rotary adjustment of the core therewithin; and the rear end of the core 10 is formed with flat sides so as to afford suitable engagement by the fingers of the user and thereby facilitate turning of the same.

Assuming that the parts are all in assembly according to Fig. 1 of the present drawing, the outer casing 1 may be held in one hand and the core 10 may be rotatably adjusted within the casing by the fingers of the other hand which are applied to the rear end of the core. In this way, the electric contacts 8 and 9 may be brought into electrical connection with the electric terminals 5 and 7, respectively, or with the terminals 6 and 7, respectively, according to whether it is desired to use the one filament or the other filament of the lamp. These two positions are at ninety degrees to each other and I have provided stops corresponding to these two positions. This stop means may consist of a projection 19, upon the forward end of the core 10, which is adapted to have stop engagement with either of the projections 20 and 21 which extend inwardly from the inside of the casing 1 just forward of the end of the core 10. If so desired, the core 10 may be adjusted to intermediate position with the contacts 8 and 9 located in the spaces between the terminals 5, 6 and 7, the light being then turned off.

The above-described type of lamp may be regarded as being similar to the general shape and design of the well-known flashlight, in that it can be handled in much the same manner, as will be quite apparent from the present disclosure.

In Figs. 10 and 11 I have disclosed my same invention but in another form of body. This second form of device has its casing 25 provided with a base portion 26, by which it may be supported upon the ground or floor for instance, and a handle 27 at the top thereof, by which it may be carried. The casing or body 25 has a suitable opening at the front thereof to receive the "seal-beam" lamp, and it has an opening through its rear wall 25a to accommodate the rear end of the device. The usual annular flange 5a of the "seal-beam" unit may engage the edge portion about the opening in the front of the body 25.

The same features are embodied in this second form of device as in the first form except that the over-all distance between the front and rear ends of the lamp holder itself is considerably less in the second form. In this second form of device the screw-threads at the rear end of the holder 1' will be continued farther forward so as to accommodate a pair of nuts 28 and 29 for engagement with the inner and outer edge portions, respectively, of the hole in the rear wall 25a of the lamp body 25. Through a hand hole 30 in one side of the body 25, access may be had to the interior thereof for securing the shank of the "seal-beam" lamp in position by means of the screw-threaded ring 3'. With this arrangement the device may be permanently attached to the rear wall of the body 25 and the "seal-beam" lamp may be readily attached to the front thereof and removed therefrom, as may be desired.

It will be observed that in this second form of device I employ the same means for holding the "seal-beam" lamp in position upon its holder, also the same means of electrical connection and the same means of adjustment therefor. The only difference is that in the one instance the holder is of greater length so as to be capable of being handled in the same manner as the familiar flash light while in the other instance the holder is enclosed within and is mounted upon an outer casing or body which is of the type often found around railroad yards and trains and is adapted to be set upright upon the table, floor or ground and to be carried by a handle in much the same manner as other lamps. In both instances the lamp may be recognized as being capable of general utility. By using this lamp in an automobile service garage, it may be attached to the automobile itself and the current therefor may be supplied from the battery of the same automobile and without having electric wires extending upon the floor or overhead through the garage. Of course this device is especially useful in cases of emergency when the user is forced to rely entirely upon the electric current afforded by the battery of his automobile. With this device it is not necessary for the user to carry with him any additional light bulb or source of electric current, as one of the head lamps of the automobile may be removed therefrom and temporarily used as part of the trouble lamp and later replaced upon the automobile; and too the battery of the same automobile may be employed as the source of electric current for the utility lamp.

This device makes it possible also to utilize "seal-beam" lamp units in which one of the filaments has burned out and which therefore is considered to be no longer useful as a head lamp upon an automobile. As above explained, the remaining filament of the discarded "seal-beam" lamp unit is equally as good as the one which has burned out and, with my present device, it is possible to obtain full use of both filaments.

When, in the use of my present device, it is connected to the source of electric current for each occasion of use and is disconnected after using the same, it is not necessary to turn the switch at the front end of the device in order to turn the light on; as this switch may at all times be left closed, the lamp being lighted by the attachment of the wires to the source of electric current, as for instance to the live line in an automobile system. When employed in such manner, it is necessary to manipulate the rotary switch only when it is desired to temporarily turn off the light without disconnecting the wires from the source of electric current or when the one filament of the lamp has burned out and it becomes necessary to switch to the other filament of the "seal-beam" lamp.

As compared with other forms of trouble lamps, it is believed that this one is of rather simple construction and hence can be manufactured and sold at a price within easy reach of all who might have use for such a device. In fact, the holder is the only equipment which it is necessary for the user to buy and obviously this may be obtained at a very popular price.

What I claim is:

In a utility lamp, the combination of a hollow holder of substantial length, means at the forward end thereof for receiving and removably holding the shank of a multiple-filament electric light bulb having a plurality of light terminals and a return line terminal arranged co-axially and spaced circumferentially about the shank of the bulb, a rotatable switch member of electric insulating material within and extending substantially the length of said holder, said switch member having two co-axially arranged and circumferentially spaced electric contacts including a return line contact arranged and spaced upon the forward end thereof in accordance with the arrangement and spacing of the terminals on the light bulb shank for closing the circuit selectively through either of the light terminals and the return line terminal on the light bulb shank so as to close selectively the circuit through either of the filaments of the light bulb, the rear end of said switch member extending out through the rear end of said holder and being provided with an end portion adapted for grasping by the hand of the user for the purpose of rotatably adjusting the switch, said switch member having a hollow core, and electric wires extending from said switch out through said hollow core and through the rear end of said switch member and having means for readily and removably attaching the same to a source of electric current.

JOHN F. GULYBAN.

REFERENCES CITED

The following references are of record in the file of this patent:

UNITED STATES PATENTS

| Number | Name | Date |
| --- | --- | --- |
| 1,208,682 | Spielman | Dec. 12, 1916 |
| 1,319,012 | Lamb | Oct. 14, 1919 |
| 1,395,490 | Graff | Nov. 1, 1921 |
| 1,578,772 | Sims | Mar. 30, 1926 |
| 1,659,013 | Anderson | Feb. 14, 1928 |
| 2,245,793 | Kurlander | June 17, 1941 |
| 2,334,900 | Bosten et al. | Nov. 23, 1943 |

FOREIGN PATENTS

| Number | Country | Date |
| --- | --- | --- |
| 201,434 | Switzerland | Feb. 16, 1939 |